United States Patent [19]

Payer

[11] Patent Number: 5,113,552
[45] Date of Patent: May 19, 1992

[54] FASTENING STRAP

[76] Inventor: Hermann Payer, Seidlgasse 29/9, A-1030 Vienna, Austria

[21] Appl. No.: 474,790
[22] PCT Filed: Nov. 11, 1988
[86] PCT No.: PCT/AT88/00094
§ 371 Date: May 10, 1990
§ 102(e) Date: May 10, 1990
[87] PCT Pub. No.: WO89/04281
PCT Pub. Date: May 18, 1989

[30] Foreign Application Priority Data

Nov. 13, 1987 [AT] Austria ............................ 3013/87

[51] Int. Cl.⁵ .............................................. A44B 21/00
[52] U.S. Cl. .................................... 24/300; 24/129 R
[58] Field of Search ............... 248/304; 24/16 R, 298, 24/300, 301, 370, 128, 129 R, 129 B, 130, 16 PB, 114.5, 343

[56] References Cited

U.S. PATENT DOCUMENTS

| | | | |
|---|---|---|---|
| 565,167 | 8/1896 | Harmon | 24/128 R |
| 749,236 | 1/1904 | Smith | 24/129 R |
| 1,067,669 | 11/1911 | Borden | 24/128 R |
| 1,721,338 | 7/1929 | Gagnon | 24/370 X |
| 2,581,114 | 1/1952 | Carson | 24/16 PBX |
| 3,042,355 | 7/1962 | Stevens | 248/340 X |
| 3,765,060 | 10/1973 | Sharick | 24/129 B |
| 4,579,075 | 4/1986 | Foreman | 24/128 X |

FOREIGN PATENT DOCUMENTS

| | | | |
|---|---|---|---|
| 248311 | 7/1966 | Austria | 24/16 PB |
| 428223 | 8/1911 | France | 248/340 |

*Primary Examiner*—James R. Brittain
*Attorney, Agent, or Firm*—Collard, Roe & Galgano

[57] ABSTRACT

A releasable fastening element for tying, bundling and fastening articles having at least one head element, including a longitudinally extending shaft with a leg extending from one end thereof to form a hook for engaging the material to be bound. The fastening element includes an elastic strap which is connected to the other end of the shaft. The elastic strap has locking elements placed at predetermined points along its length for individually and removably connecting the strap to a locking member. The locking member, which is located on the shaft, is formed by two oppositely aligned insertion grooves which are arranged parallel and adjacent to the shaft. The locking elements, which are wider than the grooves, are restricted from passing through the locking device, thus forming a loop in the strap for engaging the material to be bound. The locking member can also be formed as a sleeve with open ends mounted on the shaft parallel to the longitudinal direction thereof. The locking member can also be formed by two oppositely aligned insertion grooves cut into the shaft.

11 Claims, 1 Drawing Sheet

FASTENING STRAP

BACKGROUND OF THE INVENTION

The invention refers to a fastening strap for, on the one hand, strapping and fastening at least one object or, on the other hand, bundling several objects. The fastening strap has at least one head element being arranged in the form of a clasp and engaging with the matter to be bound and includes a leg and a shaft carrying a locking member. The strap further has a wrapping element comprising one or several enlarged locking elements and being elastic. The enlarged locking elements may be individually and detachably anchored to the locking member of the head element.

Prior Art

A similar arrangement is known (CH A-405131, GRABHER), in which an eye of an elastic ribbon is placed exactly over the hooking nose of the head element. The eye has to be widened for the purpose of effecting the ringformed closure of this fastening strap, so that said eye may be hooked onto the hooking nose which is only possible by exertion of force.

Further arrangements have been published (West German Patent 1085809, ALL-PLASTIC), (West German Patent 1486292, CALOR) which do not comprise arrangements which are elastic of extension.

Summary of the Invention

It is the object of the invention to create a fastening strap the above kind which is elastic, the handling of which allows simpler and easier performance of fastening, bundling or strapping than is possible with presently known arrangements.

This object is achieved in accordance with the invention in that on the shaft of the head element at least one insertion groove is arranged. The groove forms a locking member. The locking member can also be formed by the area between the leg and the shaft, whereby the area of the wrapping element being in the ultimate vicinity of one of the enlarged locking elements may be inserted into and anchored to the insertion groove or the area between leg and shaft by means of tensile strain.

Further arrangements of the fastening strap in accordance with the invention may comprise the shaft having an extension. The extension being arranged with the insertion groove through which the area of the wrapping element being located between two enlarged locking elements may be inserted.

Furthermore—in accordance with the invention—the insertion groove may end in a sleeve. The sleeve being arranged on said shaft and having a traverse wall, whereby said sleeve is arranged such-like in that it allows insertion of the enlarged locking elements. This arrangement is particularly suitable for higher tensile strains, as no lateral tensile forces are exerted on the shaft.

Further arrangements of the invention may comprise the shaft having two insertion grooves. The grooves being arranged such that the wrapping element is insertable into the one insertion groove in the direction of the leg and that said wrapping element is insertable into the other insertion groove in the direction of the leg. The arrangement of two insertion grooves being oppositely aligned on the shaft is particularly preferable in cases where two objects which are located away from each other at a distance are to be bound together. A further feature of the invention may consist of a detachment prevention device, said device preventing an unintended slip-out of the wrapping element from the insertion groove.

Furthermore, the invention may comprise a head element having a hook-in safety device of the spring hook type.

A further feature of the invention—not outlined in detail—may comprise the fastening strap having on both of its ends a head element.

A further feature of the invention may comprise the wrapping element being anchorable in an area, said area being adjusted to the enlarged locking elements and formed between leg and shaft.

DETAILED DESCRIPTION OF THE PREFERRED EMBODIMENTS

Figure 1:
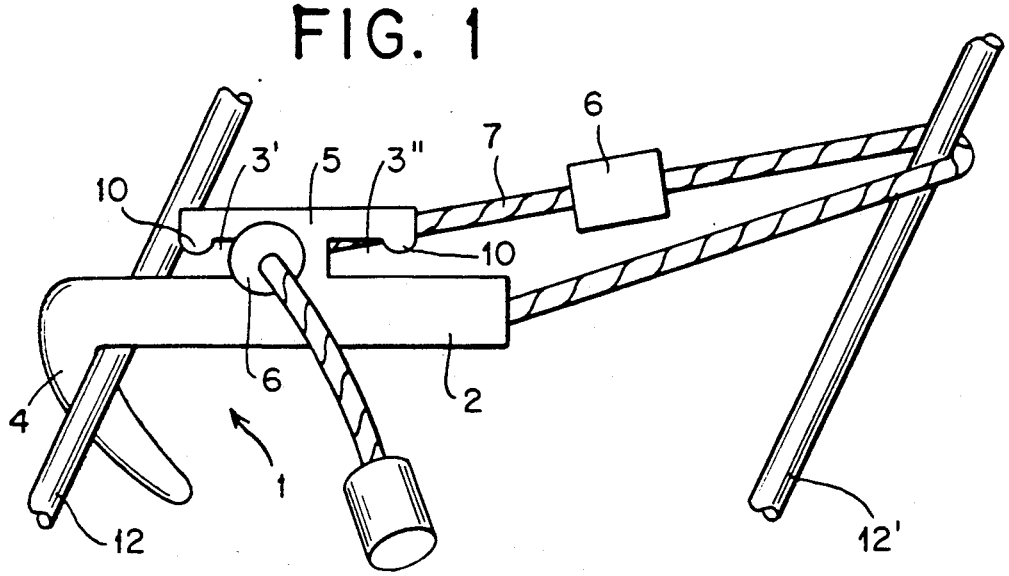
FIG. 1 a schematic view of a fastening strap strapped between two objects.

Referring to the drawings, and in particular, FIG. 1, there is shown a fastening strap strapped between two objects 12, 12' (e.g. wires, rods or anything similar). The fastening strap mainly consists of a head element in which hook 1 is arranged, a wrapping element 7 having enlarged locking elements 6 and, furthermore, of insertion grooves 3', 3" being oppositely aligned, which are formed on shaft (2) by means of extension (5). If, for example, two objects (12, 12') are to bound together by means of such a fastening strap, the area between leg (4) and shaft (2) is hooked into object 12, wrapping element 7 is wrapped around the other object 12', and subsequently the area of wrapping element 7 located between the two enlarged locking elements 6 may be inserted into insertion groove 3', whereby wrapping element 7 need not be wrapped around object 12.

In the case that it is not possible to hook hook 1 into object 12, wrapping element 7 is wrapped around object 12 (not described here any further) and, for the purpose of anchoring, wrapping element 7 is inserted into insertion groove 3", whereby leg 4 may be used as a well-engaging tensile body for the fastening strap. Insertion grooves 3', 3" comprise a detachment prevention device 10 which prevents inadvertent detachment of wrapping element 7.

Figure 2:
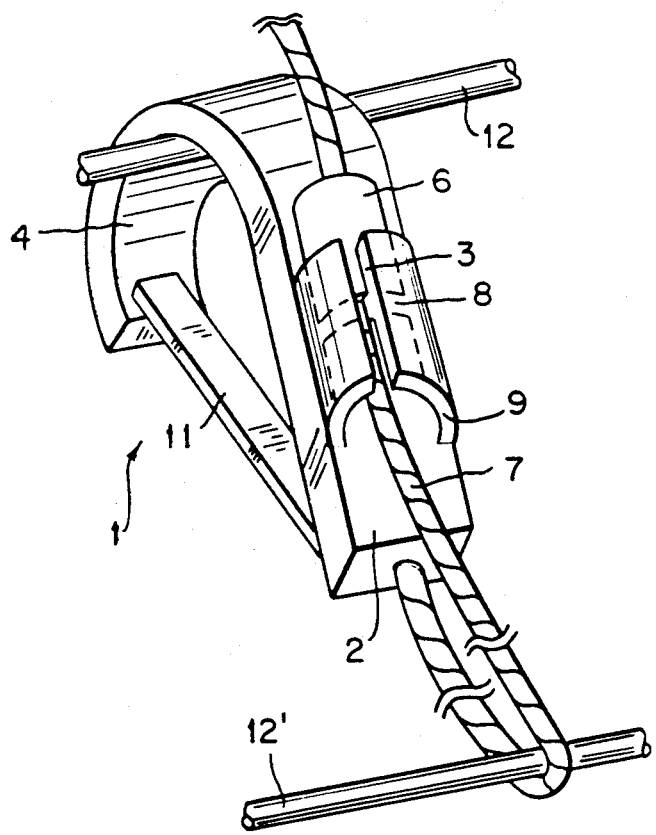
FIG. 2 is a schematic perspective view of a fastening strap strapped between two objects.

FIG. 2 shows a schematic perspective view of a fastening strap which is strapped between two objects 12, 12', whereby hook 1 comprises hook-in safety device of the spring hook type 11. Insertion groove 3, into which the area of wrapping element 7 located between the two notch elements may be inserted, ends in a sleeve 9, said sleeve being arranged on shaft 2 of the hook. Sleeve 9 is arranged such that it allows the insertion of enlarged locking element 6 from both sides and comprises a traverse wall 8 by means of which enlarged locking element 6 is to be anchored in sleeve 9.

Figure 3:
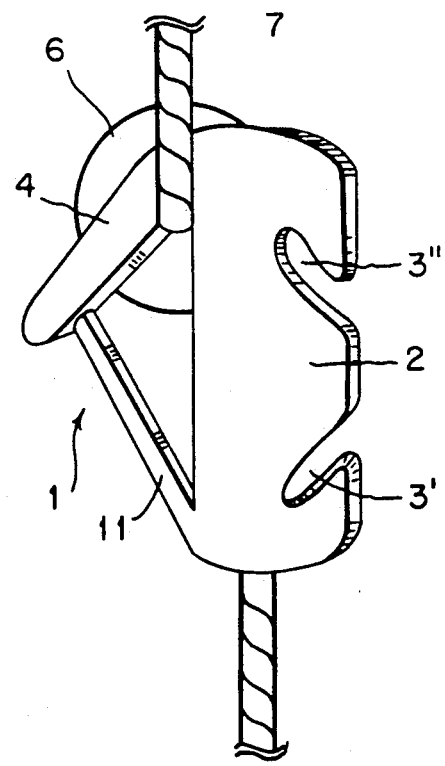
FIG. 3 is a schematic view of a head element according to another embodiment.

FIG. 3 shows a schematic view of a head element in its operational position, said element comprising two insertion grooves 3',3" arranged on shaft 2 and a hook 1 having a hook-in safety device of the spring hook type 11. Wrapping element 7 is anchored in an area which is adjusted to enlarged locking elements 6 and formed between leg 4 and shaft 2 of the hook.

The head element described in FIG. 3 enables the user to optionally anchor wrapping element 7 in hook 1, e.g. if a high amount of binding safety is required for the matter to be bound (not described here in detail), or to hook hook 1 into the matter to be bound and then, after having wrapped it around, to anchor wrapping element 7 in insertion groove 3".

A further application of the present arrangement may consist of bundling, for instance, material by means of said fastening strap and inserting wrapping element 7 into insertion groove 3', whereby subsequently the fastening strap with the bundled material may be suspended by means of hook 1 on an anchoring wire, nail and the like.

However, the present invention does not always comprise two opposedly aligned insertion grooves located on the shaft of the hook.

The arrangement of the head element with hook 1, which, for example, may be engaged with the matter to bound in a simple manner, and an insertion groove 3 arranged on shaft 2 of the hook, whereby wrapping element 7 is insertable into said groove, considerably facilitates the process of fastening, bundling and strapping compared with the present state of the art.

I claim:

1. A releasable fastening strap for fastening, bundling and strapping at least one article, comprising
   a head element having a longitudinally extending shaft and article-clasping means;
   an elongated elastic strap coupled to said shaft having at least one enlarged locking element mounted thereon, which strap is capable of being looped about said at least one article; and
   a locking member mounted on said shaft, which in cooperation with said shaft defines at least one insertion groove in which said elastic strap is releasably insertable when it is looped around said at least one article with said at least one locking element thereof abutting and being anchored against said locking member, and said locking member further defines two oppositely aligned grooves which are arranged parallel and adjacent to said shaft, said at least one enlarged locking element having a width greater than the grooves which prevents said locking element from passing through said locking member.

2. The releasable fastening strap according to claim 1, wherein said locking member further includes a generally T-shaped extension having an upstanding lower leg joined to said shaft and extending outwardly and perpendicular to the longitudinal direction of said shaft, and having two arms joined to said leg and extending parallel to the longitudinal direction of said shaft which cooperates with said shaft to define said opposite aligned grooves.

3. The releasable fastening strap according to claim 2, wherein said arms each have ends having a depending protuberance formed thereon extending toward said shaft so that said protuberance and said shaft form an opening which is narrower than the grooves and said strap and which prevents accidental disengagement of the strap when inserted in one of said grooves.

4. The releasable fastening strap according to claim 3, wherein said article-clasping means comprises a hook which extends from one end of said shaft.

5. A releasable fastening strap for fastening, bundling and strapping at least one article, comprising
   a head element having a longitudinally extending shaft and article-clasping means;
   an elongated elastic strap coupled to said shaft having at least one enlarged locking element mounted thereon, which strap is capable of being looped about said at least one article; and
   a locking member mounted on said shaft, which in cooperation with said shaft defines at least one insertion groove in which said elastic strap is releasably insertable when it is looped around said at least one article with said at least one locking element thereof abutting and being anchored against said locking member, and wherein said locking member comprises a sleeve with opposite open ends mounted on said shaft with the sleeve axis generally parallel to the longitudinal direction of said shaft, said sleeve having an insertion groove extending the entire length of said sleeve and a transverse wall located interiorly of said sleeve, said strap being insertable into said sleeve through said insertion groove, said enlarged locking element being dimensioned so as to slide into the sleeve through either of the open ends, but being prevented from sliding through said sleeve by said wall.

6. The releasable fastening strap according to claim 5, wherein said article clasping means comprises a hook which extends from one end of said shaft.

7. The releasable fastening strap according to claim 6, further including a resilient safety member having one end which is attached to said shaft at an end opposite said hook and an opposite end which is normally biased against said hook so as to form a normally closed loop, thus preventing accidental disengagement of articles engaged by said hook.

8. A releasable fastening strap for fastening, bundling and strapping at least one article, comprising:
   a head element having a longitudinally extending shaft having a longitudinally extending side and article-clasping means;
   an elongated elastic strap coupled to said shaft having at least one enlarged locking element mounted thereon, which strap is capable of being looped about said at least one article; and
   a locking member mounted on said shaft, which has two generally oppositely aligned insertion grooves formed into said shaft along said side thereof in which said elastic strap is releasably insertable when it is looped around said at least one article with said at least one locking element thereof abutting and being anchored against said locking member, and said at least one enlarged locking element having a width greater than said grooves whereby said locking element is prevented from passing through said grooves.

9. The releasable fastening strap according to claim 8, wherein said article clasping means comprises a hook which extends from one end of said shaft.

10. The releasable fastening strap according to claim 9, further including a resilient safety member having one end which is attached to said shaft at an end opposite said hook and an opposite end which is normally biased against said hook so as to form a normally closed loop, thus preventing accidental disengagement of articles engaged by said hook, said at least one enlarged locking element having a width greater than said closed loop which prevents said locking element from passing through said closed loop when said strap is inserted between said hook and said shaft.

11. The releasable fastening strap according to claim 10, wherein said fastening strap is made from a generally flat plate with said shaft, hook and safety member being generally coplanar.

* * * * *